US012763466B2

(12) United States Patent
Zhao et al.

(10) Patent No.: US 12,763,466 B2
(45) Date of Patent: Oct. 13, 2026

(54) ANTENNA STRUCTURE

(71) Applicant: Quanta Computer Inc., Taoyuan City (TW)

(72) Inventors: Yu-Chen Zhao, Taoyuan City (TW); Chung-Ting Hung, Taoyuan City (TW); Chin-Lung Tsai, Taoyuan City (TW); Kuan-Hsien Lee, Taoyuan City (TW); Chun-I Cheng, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 24 days.

(21) Appl. No.: 18/979,876

(22) Filed: Dec. 13, 2024

(65) Prior Publication Data

US 2026/0121294 A1 Apr. 30, 2026

(30) Foreign Application Priority Data

Oct. 28, 2024 (TW) ................................ 113211675

(51) Int. Cl.
*H01Q 5/30* (2015.01)
*H01Q 1/38* (2006.01)
*H01Q 1/50* (2006.01)

(52) U.S. Cl.
CPC ................ *H01Q 5/30* (2015.01); *H01Q 1/38* (2013.01); *H01Q 1/50* (2013.01)

(58) Field of Classification Search
CPC .. H01Q 1/38; H01Q 1/50; H01Q 1/36; H01Q 5/371; H01Q 21/30; H01Q 5/30–50; H01Q 5/378–392; H01Q 9/44; H01Q 1/2291; H01Q 9/30; H01Q 1/273; H01Q 9/42
See application file for complete search history.

(56) References Cited

U.S. PATENT DOCUMENTS 5,990,838 A * 11/1999 Burns .................... H01Q 21/29 343/702
7,079,079 B2 * 7/2006 Jo ........................ H01Q 9/0442 343/702
2023/0208040 A1 * 6/2023 Zhang ...................... H01Q 9/42 343/702
2024/0178561 A1 * 5/2024 Chang ...................... H01Q 9/42

FOREIGN PATENT DOCUMENTS

TW 1823424 B * 11/2023 ......... G02B 27/0176

* cited by examiner

*Primary Examiner* — Alexander H Taningco
*Assistant Examiner* — Anna N Hamadyk
(74) *Attorney, Agent, or Firm* — McClure, Qualey & Rodack, LLP

(57) ABSTRACT

An antenna structure includes a grounding radiation element, a first radiation element, a second radiation element, a third radiation element, a fourth radiation element, and a carrier element. The grounding radiation element is coupled to a grounding point. The first radiation element is coupled to a feeding point. The second radiation element is coupled to the feeding point. A first angle is formed between the first radiation element and the second radiation element. The third radiation element is coupled to the first radiation element. A second angle is formed between the first radiation element and the third radiation element. The fourth radiation element is coupled to the second radiation element. A third angle is formed between the second radiation element and the fourth radiation element.

7 Claims, 3 Drawing Sheets

ANTENNA STRUCTURE

CROSS REFERENCE TO RELATED APPLICATIONS

This application claims priority of Taiwan Patent Application No. 113211675 filed on Oct. 28, 2024, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a grounding radiation element, a first radiation element, a second radiation element, a third radiation element, a fourth radiation element, and a carrier element. The grounding radiation element is coupled to a grounding point. The first radiation element is coupled to a feeding point. The second radiation element is coupled to the feeding point. A first angle is formed between the first radiation element and the second radiation element. The third radiation element is coupled to the first radiation element. A second angle is formed between the first radiation element and the third radiation element. The fourth radiation element is coupled to the second radiation element. A third angle is formed between the second radiation element and the fourth radiation element. The grounding radiation element, the first radiation element, the second radiation element, the third radiation element, and the fourth radiation element are disposed on the carrier element.

In some embodiments, the grounding radiation element substantially has a variable-width smooth shape.

In some embodiments, the first angle is from 80 to 100 degrees.

In some embodiments, the second angle is from 110 to 160 degrees.

In some embodiments, the third angle is from 110 to 160 degrees.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the grounding radiation element is substantially equal to 0.5 wavelength of the first frequency band.

In some embodiments, the length of each of the first radiation element and the second radiation element is substantially equal to 0.25 wavelength of the third frequency band.

In some embodiments, the total length of the first radiation element and the third radiation element is substantially equal to 0.25 wavelength of the second frequency band.

In some embodiments, the total length of the second radiation element and the fourth radiation element is substantially equal to 0.25 wavelength of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
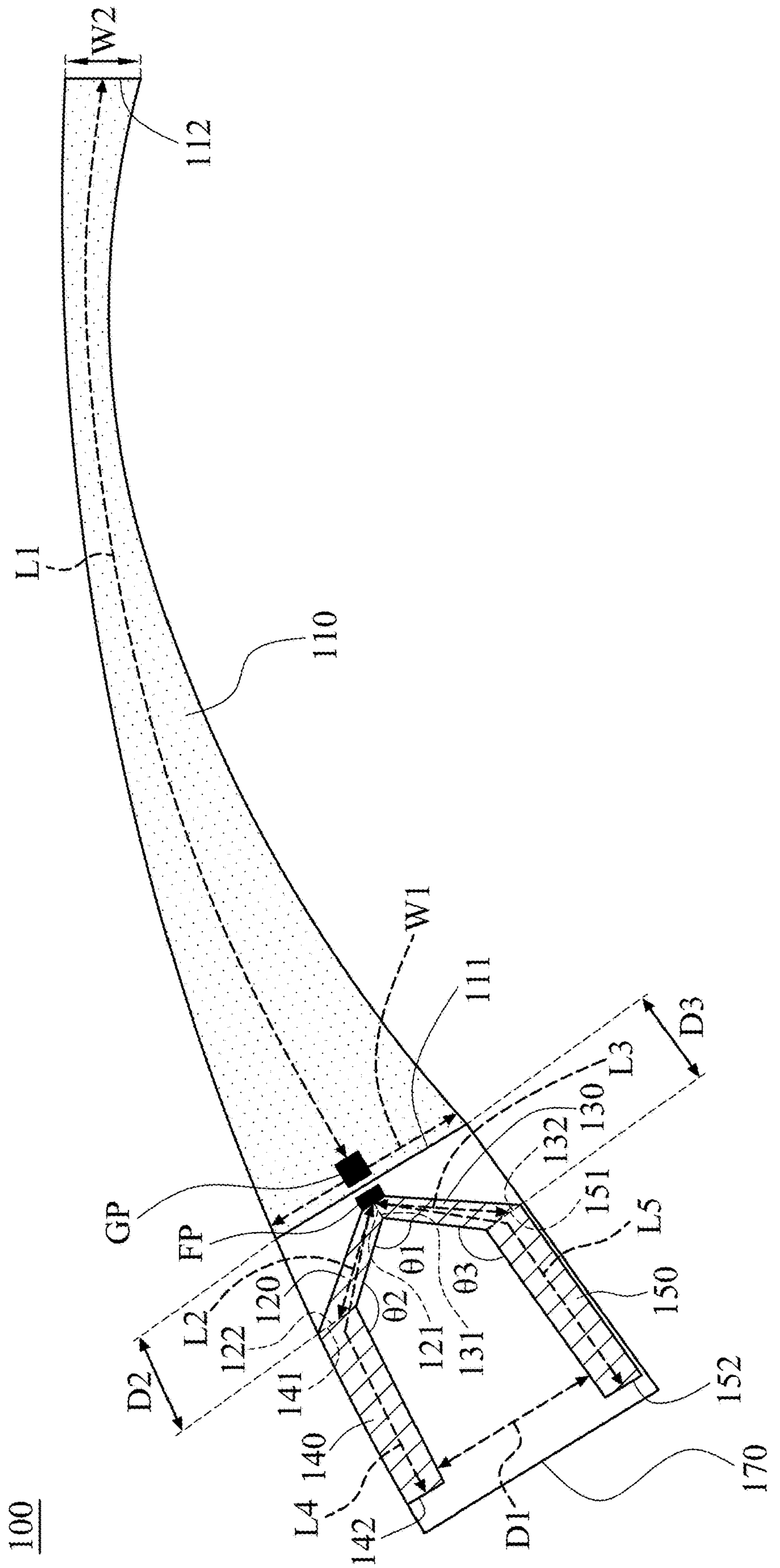
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 includes a grounding radiation element 110, a first radiation element 120, a second radiation element 130, a third radiation element 140, a fourth radiation element 150, and a carrier element 170. The grounding radiation element 110, the first radiation element 120, the second radiation element 130, the third radiation element 140, and the fourth radiation element 150 may all be made of metal materials, such as copper, silver, aluminum, iron, or an alloy thereof.

The grounding radiation element 110 may substantially have a variable-width smooth shape. Specifically, the grounding radiation element 110 has a first end 111 and a second end 112. The first end 111 of the grounding radiation element 110 is coupled to a grounding point GP. The second end 112 of the grounding radiation element 110 is an open end. In the grounding radiation element 110, the width W1 of the first end 111 is greater than the width W2 of the second end 112. For example, the width W1 of the first end 111 may be at least twice the width W2 of the second end 112, but it is not limited thereto.

The first radiation element 120 may substantially have a relatively short straight-line shape. Specifically, the first radiation element 120 has a first end 121 and a second end 122. The first end 121 of the first radiation element 120 is coupled to a feeding point FP. The feeding point FP may be further coupled to a positive electrode of a signal source (not shown). A negative electrode of the signal source may be coupled to the grounding point GP. For example, the signal source may be an RF (Radio Frequency) module for exciting the antenna structure 100. In some embodiments, the antenna structure 100 further includes a coaxial cable with a central conductor and a conductive housing (not shown). The positive electrode of the signal source may be coupled through the central conductor of the coaxial cable to the feeding point FP. The negative electrode of the signal source may be coupled through the conductive housing of the coaxial cable to the grounding point GP. In some embodiments, the coaxial cable substantially extends along the grounding radiation element 110, but it is not limited thereto.

The second radiation element 130 may substantially have another relatively short straight-line shape. Specifically, the second radiation element 130 has a first end 131 and a second end 132. The first end 131 of the second radiation element 130 is coupled to the feeding point FP. In some embodiments, a first angle θ1 is formed between the first radiation element 120 and the second radiation element 130. For example, the first angle θ1 may be an acute angle, a right angle, or an obtuse angle. In some embodiments, both the first radiation element 120 and the second radiation element 130 are arranged adjacent to the grounding radiation element 110. It should be noted that the term "adjacent" or "close" over the disclosure means that the distance between (or the spacing of) two corresponding elements is smaller than a predetermined distance (e.g., 5 mm or the shorter), but often does not mean that the two corresponding elements directly touch each other (i.e., the aforementioned distance/space between them is reduced to 0).

The third radiation element 140 may substantially have a relatively long straight-line shape (compared with the first radiation element 120). Specifically, the third radiation element 140 has a first end 141 and a second end 142. The first end 141 of the third radiation element 140 is coupled to the second end 122 of the first radiation element 120. The second end 142 of the third radiation element 140 is an open end. In some embodiments, a second angle θ2 is formed between the first radiation element 120 and the third radiation element 140. For example, the second angle θ2 may be an obtuse angle, but it is not limited thereto.

The fourth radiation element 150 may substantially have another relatively long straight-line shape (compared with the second radiation element 130). Specifically, the fourth radiation element 150 has a first end 151 and a second end 152. The first end 151 of the fourth radiation element 150 is coupled to the second end 132 of the second radiation element 130. The second end 152 of the fourth radiation element 150 is an open end. In some embodiments, a third angle θ3 is formed between the second radiation element 130 and the fourth radiation element 150. For example, the third angle θ3 may be another obtuse angle, which may be approximately equal to the aforementioned second angle θ2, but it is not limited thereto. In some embodiments, the second end 142 of the third radiation element 140 and the second end 152 of the fourth radiation element 150 substantially extend in the same direction.

The grounding radiation element 110, the first radiation element 120, the second radiation element 130, the third radiation element 140, and the fourth radiation element 150 may all be disposed on the same surface of the carrier element 170. The shape and type of the carrier element 170 are not limited in the invention. For example, the carrier element 170 may be an FR4 (Flame Retardant 4) substrate, a PCB (Printed Circuit Board), or an FPC (Flexible Printed Circuit).

Figure 2:
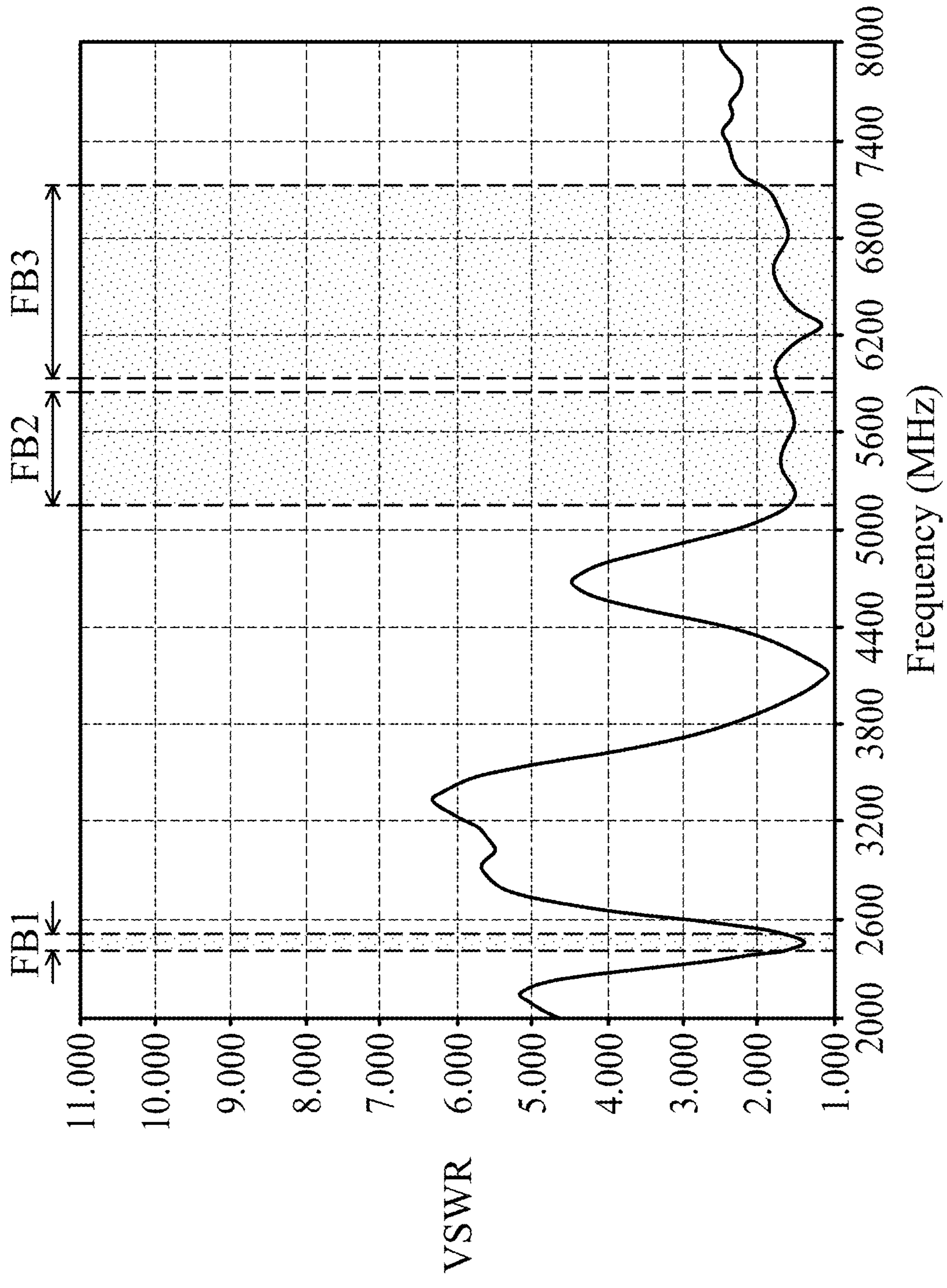
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz.

Therefore, the antenna structure 100 can support at least the wideband operations of WLAN (Wireless Local Area Network), Wi-Fi 6E, and Wi-Fi 7.

In some embodiments, the operational principles of the antenna structure 100 are described below. The grounding radiation element 110 can be excited to generate the first frequency band FB1. The first radiation element 120, the second radiation element 130, the third radiation element 140, and the fourth radiation element 150 can be excited to generate the second frequency band FB2. The first radiation element 120 and the second radiation element 130 can be excited to generate the third frequency band FB3. According to practical measurements, the variable-width design of the grounding radiation element 110 can be configured to increase the bandwidth of the first frequency band FB1. There is a first distance D1 between the third radiation element 140 and the fourth radiation element 150. The first distance D1 can be configured to fine-tune the impedance matching of the second frequency band FB2. Furthermore, there is a second distance D2 between the grounding radiation element 110 and the third radiation element 140. Also, there is a third distance D3 between the grounding radiation element 110 and the fourth radiation element 150. Both the second distance D2 and the third distance D3 can be configured to fine-tune the impedance matching of the third frequency band FB3.

In some embodiments, the element sizes of the antenna structure 100 are described below. The length L1 of the grounding radiation element 110 may be substantially equal to 0.5 wavelength (λ/2) of the first frequency band FB1 of the antenna structure 100. The width W1 of the first end 111 of the grounding radiation element 110 may be from 7 mm to 9 mm. The width W2 of the second end 112 of the grounding radiation element 110 may be from 2 mm to 4 mm. The length L2 of the first radiation element 120 may be substantially equal to 0.25 wavelength (λ/4) of the third frequency band FB3 of the antenna structure 100. The length L3 of the second radiation element 130 may be substantially equal to 0.25 wavelength (λ/4) of the third frequency band FB3 of the antenna structure 100. The total length L4 of the first radiation element 120 and the third radiation element 140 may be substantially equal to 0.25 wavelength (λ/4) of the second frequency band FB2 of the antenna structure 100. The total length L5 of the second radiation element 130 and the fourth radiation element 150 may be substantially equal to 0.25 wavelength (λ/4) of the second frequency band FB2 of the antenna structure 100. The first angle θ1 may be from 80 to 100 degrees. The second angle θ2 may be from 110 to 160 degrees. The third angle θ3 may be from 110 to 160 degrees. The first distance D1 may be from 6 mm to 8 mm. The second distance D2 may be from 2 mm to 4 mm. The third distance D3 may be from 2 mm to 4 mm. The above ranges of element sizes are calculated and obtained according to many experimental results, and they help to optimize the operational bandwidth and the impedance matching of the antenna structure 100.

Figure 3:
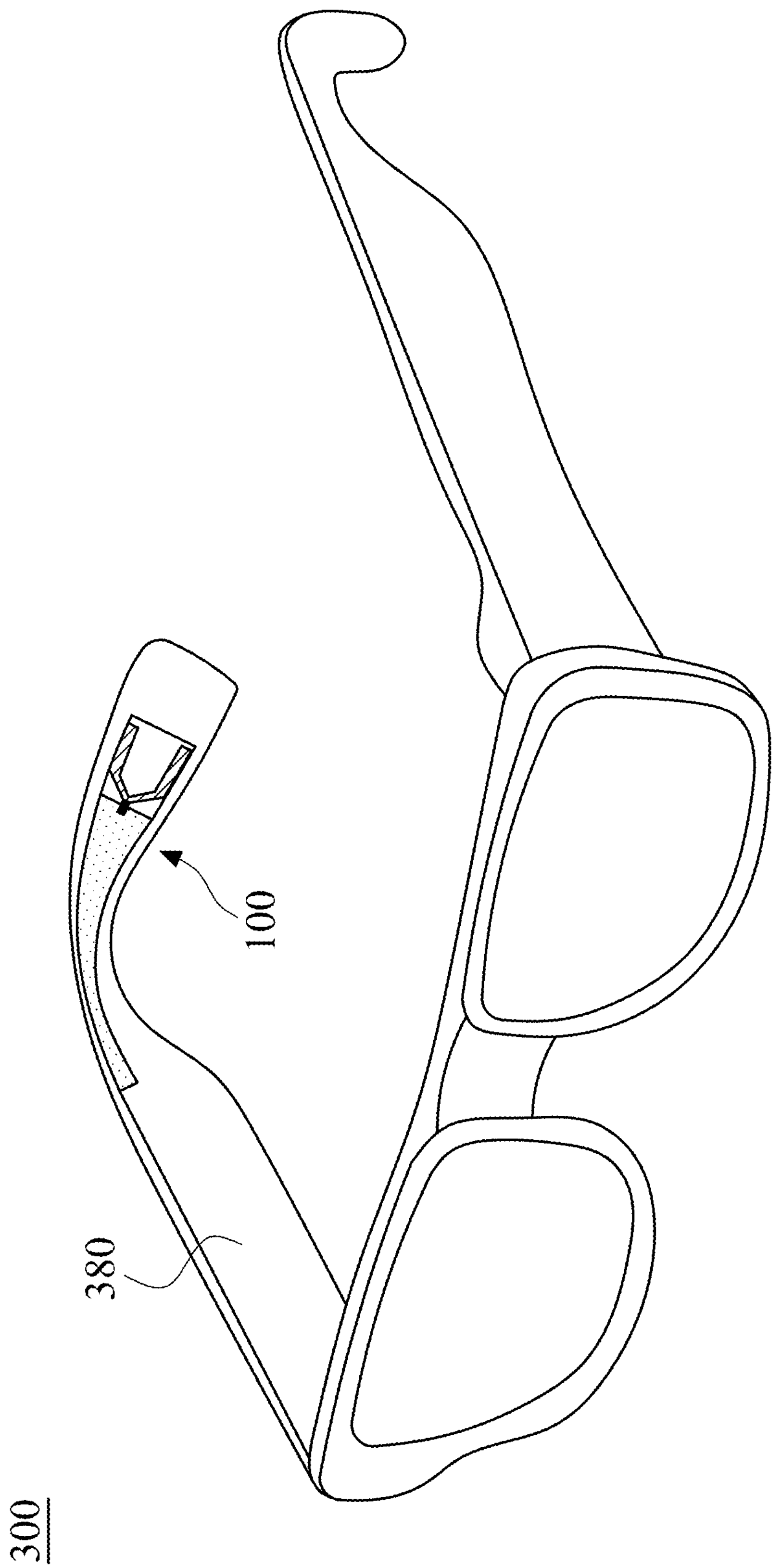
FIG. 3 is a diagram of a wearable device according to an embodiment of the invention.

FIG. 3 is a diagram of a wearable device 300 according to an embodiment of the invention. In the embodiment of FIG. 3, the wearable device 300 is a pair of smart eyeglasses with the function of wireless communication, and includes a nonconductive frame element 380. The aforementioned antenna structure 100 is disposed on the nonconductive frame element 380. For example, the aforementioned antenna structure 100 may be positioned at any terminal of the nonconductive frame element 380. In alternative embodiments, the wearable device 300 further includes an RF circuit, a filter, an amplifier, and/or a processor, but it is not limited thereto.

The invention proposes a novel antenna structure. In comparison to the conventional design, the invention has at least the advantages of small size, wide bandwidth, and integration with a wearable device. Therefore, the invention is suitable for application in a variety of mobile communication devices or the IOT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a grounding radiation element, coupled to a grounding point;

a first radiation element, coupled to a feeding point;

a second radiation element, coupled to the feeding point, wherein a first angle is formed between the first radiation element and the second radiation element;

a third radiation element, coupled to the first radiation element, wherein a second angle is formed between the first radiation element and the third radiation element;

a fourth radiation element, coupled to the second radiation element, wherein a third angle is formed between the second radiation element and the fourth radiation element; and a carrier element, wherein the grounding radiation element, the first radiation element, the second radiation element, the third radiation element, and the fourth radiation element are disposed on the carrier element;

wherein the second angle is from 110 to 160 degrees;

wherein the third angle is from 110 to 160 degrees;

wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

2. The antenna structure as claimed in claim 1, wherein the grounding radiation element substantially has a variable-width smooth shape.

3. The antenna structure as claimed in claim 1, wherein the first angle is from 80 to 100 degrees.

4. The antenna structure as claimed in claim 1, wherein a length of the grounding radiation element is substantially equal to 0.5 wavelength of the first frequency band.

5. The antenna structure as claimed in claim 1, wherein a length of each of the first radiation element and the second radiation element is substantially equal to 0.25 wavelength of the third frequency band.

6. The antenna structure as claimed in claim 1, wherein a total length of the first radiation element and the third radiation element is substantially equal to 0.25 wavelength of the second frequency band.

7. The antenna structure as claimed in claim 1, wherein a total length of the second radiation element and the fourth radiation element is substantially equal to 0.25 wavelength of the second frequency band.

* * * * *